Nov. 4, 1958  H. D. DE LOACH ET AL  2,859,059
BALL JOINT
Filed June 11, 1954
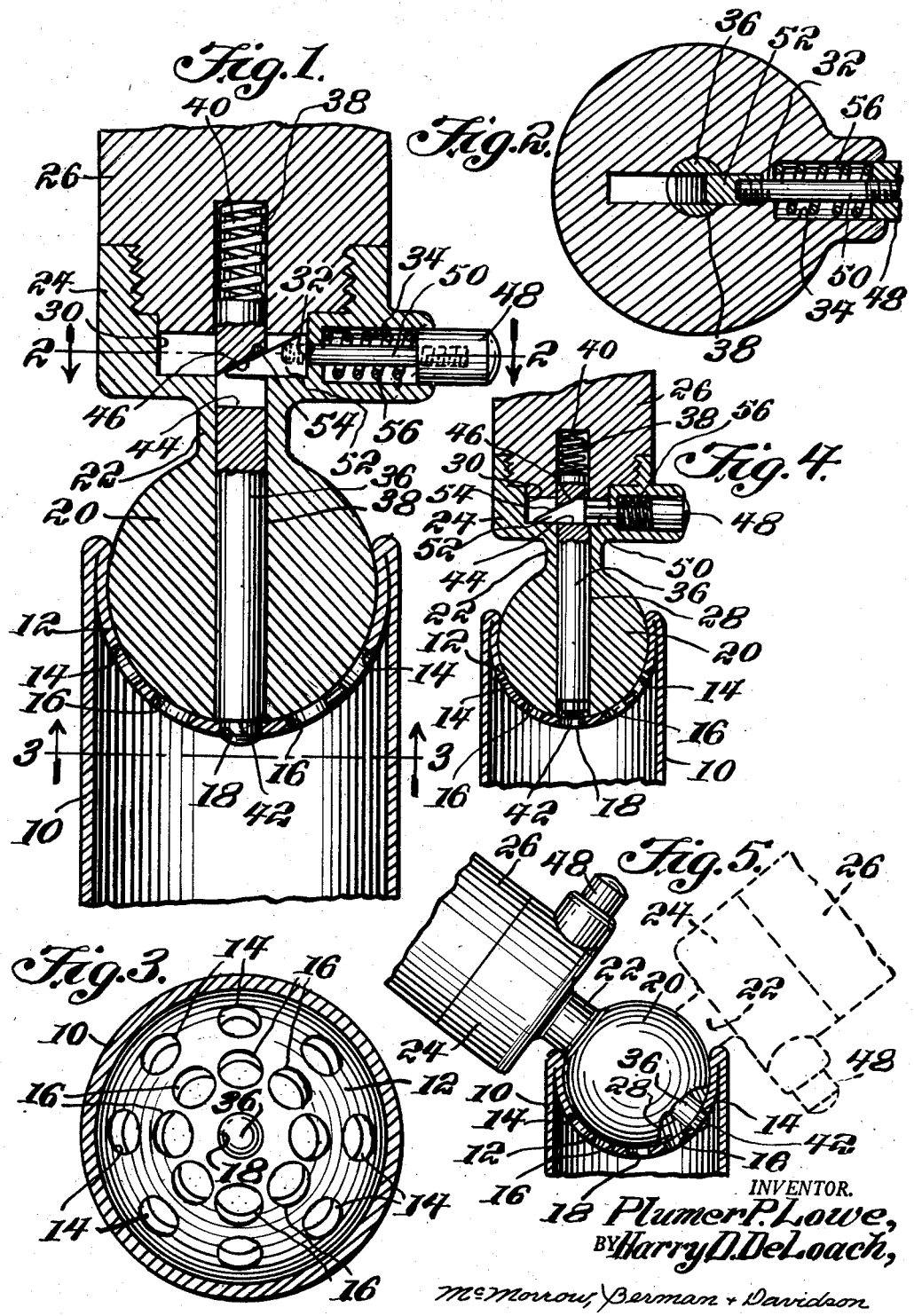

United States Patent Office 2,859,059
Patented Nov. 4, 1958

2,859,059

BALL JOINT

Harry D. De Loach, Beaufort, S. C., and Plumer P. Lowe, Balsam, N. C.

Application June 11, 1954, Serial No. 436,186

1 Claim. (Cl. 287—87)

This invention relates to a ball joint and has for its primary object to retain two elements at a selected angle relative to one another.

Another object is to facilitate the rapid change of position of the elements with but a minimum of effort on the part of the user.

The above and other objects may be attained by employing this invention which embodies among its features a substantially hemispherical socket having rows of circumferentially spaced radial openings extending therethrough, a spherical head seated in said socket for universal movement therein, a bolt mounted in said head for movement diametrically therethrough, a spring operatively carried by the head and engaging the bolt for advancing said bolt through the head and into an opening in the socket to lock the ball in a selected position relative to the socket, and actuating means carried by the ball and operatively engaging the bolt for moving it against the effort of the spring and retracting it into the head to permit said head to move relative to the socket.

Other features include an opening extending through the bolt intermediate the ends thereof, a push button carried by the head for movement along an axis which intersects the axis of the bolt, a wedge carried by the push button for movement therewith through the opening in the bolt for engaging said bolt and retracting it into the head, and a spring carried by the head and engaging the push button for moving the wedge away from the bolt.

In the drawings:

Figure 1 is a longitudinal sectional view through a ball joint embodying the features of this invention;

Figure 2 is a horizontal sectional view taken substantially on the line 2—2 of Figure 1;

Figure 3 is a horizontal sectional view taken substantially on the line 3—3 of Figure 1;

Figure 4 is a view on a reduced scale showing the bolt retracted; and

Figure 5 is a fragmentary sectional through the device of Figure 4, showing the head and socket in one extreme position in full line, and the head in another extreme position in dotted lines relative to the socket.

Referring to the drawings in detail, a sleeve 10 is provided adjacent one end with a socket 12 having annular rows 14 and 16 of radial openings extending therethrough and a central opening 18. The openings in the rows 14 and 16 are circumferentially spaced, as will be readily understood upon reference to Figure 3.

Seated in the socket 12 for universal movement therein is a spherical head 20 carrying a radial neck 22 and attaching cup 24 by means of which a suitable arm element 26 may be connected to the neck 22. Extending through the head 20 and neck 22 is an opening 28 which extends diametrically through the spherical head 20 and is adapted to align with the openings in the rows of openings 14 and 16 and the opening 18. Opening into the cup 24 through the top thereof and communicating with the opening 28 is an axial bore merging into a diametrically extending slot 30 which defines a chamber in which the bolt releasing mechanism operates in a manner to be more fully hereinafter described and opening through the side of the cup 24 and communicating through a passage 32 with the chamber 30 is a radial bore 34.

Extending through the opening 28 in the neck 22 and head 20 is a bolt 36 which also extends through the chamber 30 and into an axial recess 38 in the member 26. Seated on the innermost end of the recess 38 and bearing on the end of the bolt which extends into said recess is a compression coil spring 40 which exerts yielding pressure on the bolt 36 to project it toward the socket 12 and through an opening in one or the other rows of openings 14 and 16 or through the opening 18, as will be readily understood upon reference to the drawings. Carried by the end of the bolt 36 remote from the spring 40 is a shoulder 42 which extends annularly around the bolt and is adapted to engage the socket 12 in surrounding relation with the opening through which the bolt is projected. Extending transversely through the bolt 36 between its upper and lower ends is a passage 44 having an inclined upper wall 46 defining a cam, the purpose of which will hereinafter appear.

Mounted for sliding movement through the outer end of the bore 34 is a push button 48 carrying a stem 50 which projects through the opening 32 and carries a wedge 52 within the chamber 30. The upper edge 54 of the wedge 52 inclines upwardly as it approaches the push button 48 and defines a cam which is adapted to engage the cam face 46 of the opening 44 so that as the push button is moved inwardly, the wedge 52 will move the bolt 36 against the effort of the spring 40. A compression coiled spring 56 surrounds the stem 50 and engages the inner end of the bore 34, while the opposite end of the coiled spring bears against the push button 48 to urge the latter outwardly and the wedge 52 away from the bolt 36.

In use, it will be evident that the push button 48 is normally projected outwardly beyond the cup 24 under the influence of the spring 56 so as to hold the wedge 52 in a position to permit the bolt 36 to be projected under the influence of the spring 40 through one of the openings in the socket 12. When it is desired to alter the position of the spherical head 20 relative to the socket 12, pressure is applied to the push button 48 to move it against the effort of the spring 56 and force the wedge 52 through the opening 44 in the bolt, as suggested in Figure 4, to move the bolt against the effort of the spring 40 and retract it from engagement with an opening in the socket 12. Such movement of the bolt will retract it wholly within the head 20 so that the head may be moved to a selected annular position to the socket 12 and sleeve 10, as suggested in Figure 5.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A ball joint comprising a substantially hemispherical socket having a central opening and annular rows of openings concentric with the center opening; a spherical head seated in the socket for universal movement therein; a neck integral with and projecting radially from said head; a cylindrical attaching cup integral with said neck and aligned axially with the neck, said cup being formed with an axial, threaded counterbore at that end thereof remote from the neck, an internal shoulder at the base of the counterbore, an axial bore communicating with the counterbore and having a diameter common to the inner diameter of the shoulder, and a diametrically extending slot formed in the bottom of said axial bore, the head having a diametrical through passage opening at one end into said slot and registrable at its other end with a selected one of said openings responsive to universal movement of the head in the socket to a selected position, said cup being formed with a radial bore aligned longitudinally with the slot and communicating at one end with the slot; an arm element having an axial recess opening upon one end thereof and aligned with the diametrical passage of the head, said one end of the arm element having a reduced threaded portion engaging in the counterbore and having a boss reduced in diameter relative to the threaded portion and engaging in the axial bore to form said slot into an enclosed cavity extending diametrically of the attaching cup, said recess of the arm element opening into the slot; a compression coil spring seated in the recess of the arm element; an elongated bolt slidable in the recess of the arm element and the passage of the head, said bolt having intermediate its ends a transverse opening having an inclined wall at one end forming a cam surface, the spring bearing against one end of the bolt to urge the same in the direction of said socket and the other end of the bolt having a reduced extension engageable in a selected opening of the socket on expansion of the spring; a push button slidable in the radial bore of the attaching cup; a stem carried by the push button; a wedge carried by the stem and sliding in the slot diametrically of the attaching cup, said wedge engaging in the transverse opening of the bolt in camming engagement with the inclined surface, whereby on extension of the push button into the radial bore said bolt will be retracted against the restraint of the spring to free the head for universal movement relative to the socket; and a spring within said radial bore exerting pressure against the push button to urge the same outwardly of the attaching cup, said slot having straight, parallel side walls and said wedge element having straight side surfaces in contact with the side walls to prevent rotatable movement of the wedge element about the axis of the stem, the wedge element having a free end engaged in the opening of the bolt in the outwardly shifted position of the push button.

References Cited in the file of this patent

UNITED STATES PATENTS

| 122,061 | Robie | Dec. 19, 1871 |
| 206,393 | Ellinger | July 30, 1878 |
| 245,659 | Renner | Aug. 16, 1881 |
| 1,257,998 | Gruber | Mar. 5, 1918 |

FOREIGN PATENTS

| 83,831 | Switzerland | June 1, 1920 |
| 175,957 | Switzerland | July 1, 1935 |